(12) United States Patent
Korlapati et al.

(10) Patent No.: US 10,268,724 B2
(45) Date of Patent: Apr. 23, 2019

(54) TECHNIQUES FOR IMPROVING THE PERFORMANCE OF COMPLEX QUERIES

(71) Applicant: TERADATA US, INC., Dayton, OH (US)

(72) Inventors: Rama Krishna Korlapati, El Segundo, CA (US); Paul Sinclair, Manhattan Beach, CA (US); Grace Kwan-On Au, Rancho Palos Verdes, CA (US); Vijay Sarathy, Portland, OR (US)

(73) Assignee: Teradata US, Inc., San Diego, CA (US)

(*) Notice: Subject to any disclaimer, the term of this patent is extended or adjusted under 35 U.S.C. 154(b) by 0 days.

(21) Appl. No.: 14/041,790

(22) Filed: Sep. 30, 2013

(65) Prior Publication Data

US 2014/0280036 A1    Sep. 18, 2014

Related U.S. Application Data

(60) Provisional application No. 61/788,743, filed on Mar. 15, 2013.

(51) Int. Cl.
*G06F 17/30* (2006.01)

(52) U.S. Cl.
CPC .. *G06F 17/30463* (2013.01); *G06F 17/30442* (2013.01)

(58) Field of Classification Search
CPC ............... G06F 17/30463; G06F 17/30442
USPC ....................................................... 707/718
See application file for complete search history.

(56) References Cited

U.S. PATENT DOCUMENTS

| | | | |
|---|---|---|---|
| 5,335,345 A * | 8/1994 | Frieder | G06F 17/30474 |
| 6,356,887 B1 * | 3/2002 | Berenson et al. | |
| 7,596,550 B2 | 9/2009 | Mordvinov et al. | |
| 7,634,477 B2 * | 12/2009 | Hinshaw | G06F 17/30477 |
| 8,060,495 B2 | 11/2011 | Beavin et al. | |
| 8,290,936 B2 | 10/2012 | Day et al. | |
| 9,430,280 B1 * | 8/2016 | Shih | G06F 9/485 |
| 9,479,382 B1 * | 10/2016 | Ward, Jr. | G06F 9/50 |
| 2003/0088546 A1 * | 5/2003 | Brown | G06Q 10/10 |
| 2003/0088579 A1 * | 5/2003 | Brown | G06F 17/30595 |
| 2005/0090978 A1 * | 4/2005 | Bathory | G08G 5/0013 701/469 |
| 2006/0020500 A1 * | 1/2006 | Turner | G06Q 10/06312 705/7.26 |
| 2006/0235739 A1 * | 10/2006 | Levis | G06Q 10/08 705/1.1 |
| 2008/0104095 A1 * | 5/2008 | Heifets | G06F 17/2247 |
| 2008/0104592 A1 * | 5/2008 | Heifets | G06F 9/445 718/1 |
| 2009/0100004 A1 * | 4/2009 | Andrei | G06F 17/30424 |
| 2009/0271385 A1 * | 10/2009 | Krishnamoorthy et al. | 707/4 |
| 2009/0327242 A1 * | 12/2009 | Brown | G06F 17/30463 |

(Continued)

*Primary Examiner* — Mark E Hershley
(74) *Attorney, Agent, or Firm* — Schwegman, Lundberg & Woessner, P.A.; Randy L. Campbell, Jr.

(57) ABSTRACT

Techniques for improving complex database queries are provided. A determination is made whether to adopt a static or dynamic query execution plan based on metrics. When the dynamic query execution plan is used, a request fragment of the request is planned and the corresponding plan fragment is executed. The processed fragment provides feedback related to its processing to the remaining request and the process is repeated on the remaining request until the request is completed.

18 Claims, 3 Drawing Sheets

(56) References Cited

U.S. PATENT DOCUMENTS

| | | | |
|---|---|---|---|
| 2010/0145929 A1* | 6/2010 | Burger et al. | G06F 17/30 707/713 |
| 2011/0131199 A1 | 6/2011 | Simon et al. | |
| 2011/0184604 A1* | 7/2011 | Franke | G05D 1/0088 701/23 |
| 2012/0041942 A1* | 2/2012 | Riepshoff | G06F 17/30 707/718 |
| 2012/0191698 A1 | 7/2012 | Albrecht et al. | |
| 2013/0159286 A1 | 6/2013 | Manzano Macho et al. | |
| 2014/0095533 A1* | 4/2014 | Shukla et al. | G06F 17/30 707/769 |
| 2014/0156636 A1* | 6/2014 | Bellamkonda et al. | G06F 17/30 707/718 |
| 2014/0229221 A1* | 8/2014 | Shih | G06Q 10/06313 705/7.23 |

\* cited by examiner

TECHNIQUES FOR IMPROVING THE PERFORMANCE OF COMPLEX QUERIES

RELATED APPLICATIONS

The present application is with, claims priority to, and is a non-provisional application of Provisional Application No. 61/788,743 entitled: "Techniques for Improving Performance of Complex Queries," filed on Mar. 15, 2013; the disclosure of which is hereby incorporated by reference in its entirety herein and below.

BACKGROUND

In large commercial database systems statistics are often gathered for the tables and other constructs of the database. These statistics are useful in identifying costs, which are used to generate an optimal plan for a given query. That is, large scale databases include query optimizers that determine a most efficient way to execute a given query by considering multiple alternative query plans and the cost of each individual query plan. The statistics are then vital to computing costs for a given request consisting of one or more queries.

So, query optimizers depend on compile-time information, such as statistics, cost parameters, predicate values, and resource availability for query optimization. A final plan for a request is referred to as a static plan and is chosen by computing a cost for each possible plan variation and then selecting the least expensive plan. During this process, the optimizer assumes that all the compile-time information is accurate and generates the plan for an entire request (a request can include multiple statements/queries). However, this assumption is not always true, particularly for complex queries.

Moreover, errors in cardinality and cost estimations for a static plan grow exponentially as the number of joins increases in the request even if there are good estimations for single-table cardinalities and selectivities. Skewed data and missing statistics make the errors grow even more, leading to sub-optimal plans, which either run out of spool or cause skewed processing. Further, even though the actual table row counts, Central Processing Unit (CPU) usage, and Input/Output (I/O) counts for intermediate steps may differ significantly from optimizer estimates; the optimizers blindly continue to execute the static plan.

SUMMARY

In various embodiments, techniques for improving the performance of complex queries are presented. According to an embodiment, a method for selecting a query plan for a complex query is provided.

Specifically, a determination is made as to whether to execute a request via static plan generation or dynamic plan generation. Next, the request is fragmented into request fragments when dynamic plan generation is selected; a first request fragment is determined, planned, and executed, then a second is determined, planned, and executed, etc until the request has been completed.

DETAILED DESCRIPTION

Figure 1:
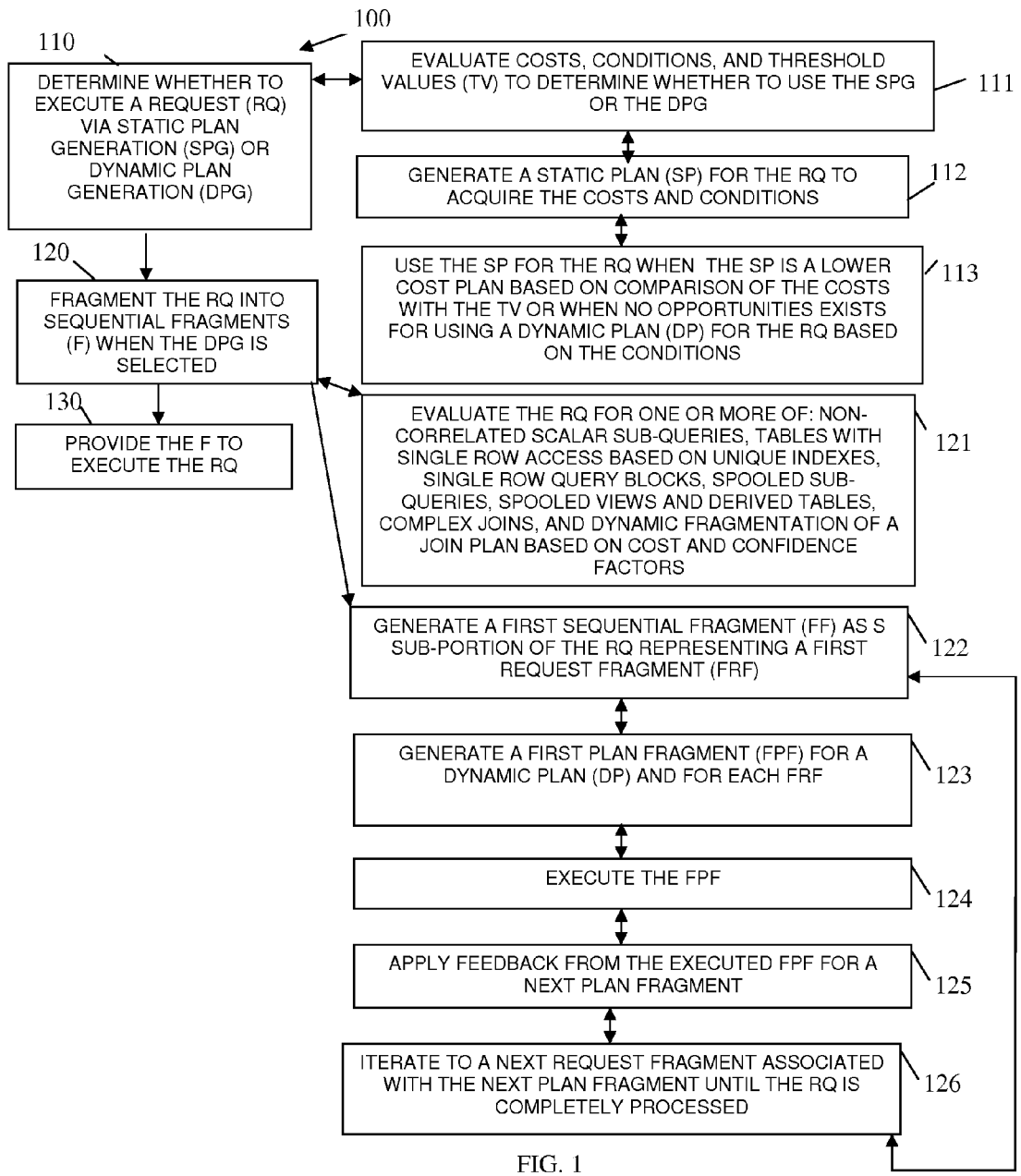
FIG. 1 is a diagram of a method for selecting a query plan for a complex query, according to an example embodiment.

FIG. 1 is a diagram of a method 100 for selecting a query plan for a complex query, according to an example embodiment. The method 100 (hereinafter "query plan selector") is implemented as executable instructions that are programmed and reside within memory and/or non-transitory computer-readable storage media for execution on processing nodes (processors) of a network; the network wired, wireless, and/or a combination of wired and wireless.

The query plan selector can be implemented as an enhancement to an existing query optimizer for a database system or can be provided as an external service that assists in selecting an optimal query plan for a query optimizer.

As used herein, a "request fragment" is a portion of a request for which a plan is generated and executed. A "plan fragment" is a series of one or more steps generated for a request fragment. A "static plan" is a plan generated for a request based on static information, such as collected statistics, access module processor samples, and the like. A "dynamic plan" (includes plan fragments) is a plan generated incrementally using feedback or results or statistical information from intermediate spools. "Incremental Planning and Execution (IPE)" is a framework to produce and execute the dynamic plans.

It is within this initial context that the processing associated with the query plan selector is now presented with reference to the FIG. 1.

At 110, the query plan selector determines whether to execute a query request via static plan generation or dynamic plan generation. That is, the query plan selector determines whether the query plan for the query request is going to be a static plan produced from static plan generation (such as a query optimizer) or whether the query plan for the query request is going to be a dynamic plan produced from an IPE and the techniques discussed herein and below.

According to an embodiment, at 111, the query plan selector evaluates costs, conditions, and threshold values to determine whether to use the static plan generation or dynamic plan generation.

Continuing with the embodiment of 111 and at 112, the query plan selector generates a static plan for the query request to acquire the costs and the conditions. So, initially to decide on which route to take (static plan versus dynamic plan), the query plan selector uses a static plan generation technique to produce a static plan for the request. This permits costs and conditions to be resolved.

Still continuing with the embodiment of 112 and at 113, the query plan selector uses the static plan for the request when the static plan is a lower cost plan based on comparison of the costs with the threshold values or when no opportunities exist for using a dynamic plan for the request based on the conditions (discussed below with reference to the processing at 121).

At 120, the query plan selector fragments the request into sequential fragments when the dynamic plan generation is selected. The plan fragment for each selected fragment can be independently executed but provides feedback, results, or statistical information to subsequent processing of the remaining request from which the request fragment is selected.

According to an embodiment, at 121, the query plan selector evaluates the request for one or more of: non-correlated scalar sub-queries, tables with single-row access based on unique indexes, single row query blocks, spooled sub-queries, spooled views and derived tables, complex joins, and dynamic fragmentation of a join based on cost and confidence factors.

In another case, at 122, the query plan selector generates a first request fragment as a sub-portion of the query request representing a first request fragment.

Continuing with 122 and at 123, the query plan selector generates a first plan fragment for the first request fragment.

Still continuing with 123 and at 124, the query plan selector executes the first plan fragment.

Continuing with 124 and at 125, the query plan selector applies feedback from the executed first plan fragment to the remaining portion of the request.

Still continuing with 125 and at 126, the query plan selector iterates a next request fragment, generates a corresponding plan fragment, executes this plan fragment, and applies the feedback to the remaining portion of the request until the request is completely processed.

Figure 2:
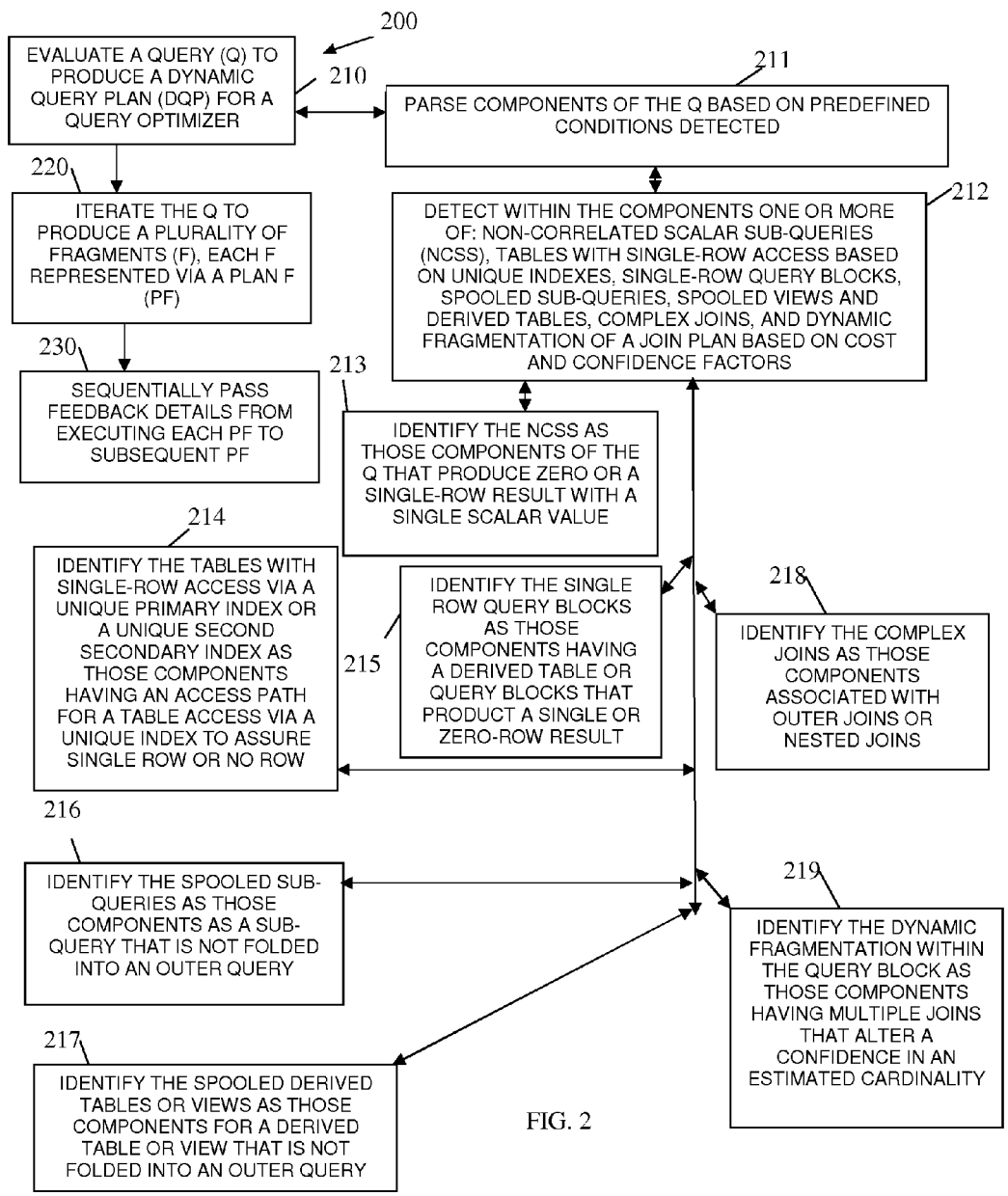
FIG. 2 is a diagram of another method for selecting a query plan for a complex query, according to an example embodiment.

FIG. 2 is a diagram of another method 200 for selecting a query plan for a complex query, according to an example embodiment. The method 200 (hereinafter "dynamic query plan manager") is implemented as executable instructions within memory and/or non-transitory computer-readable storage media that execute on one or more processors (nodes), the processors specifically configured to dynamic query plan manager. The dynamic query plan manager is also operational over a network; the network is wired, wireless, or a combination of wired and wireless.

The dynamic query plan manager presents another and in some ways an enhanced perspective of the query plan selector presented above with respect to the FIG. 1.

At 210, the dynamic query plan manager evaluates a query to produce a dynamic query plan for a query optimizer. That is, a determination was already made to go with a dynamic plan versus the static plan when executing the query (the selection criteria and embodiments were discussed above with reference to the FIG. 1).

According to an embodiment, at 211, the dynamic query plan manager parses components of the query based on predefined conditions detected within the query.

Continuing with the embodiment of 211 and at 212, the dynamic query plan manager detects within the components one or more of: non-correlated scalar sub-queries, tables with single-row access based on unique indexes, single-row query blocks, spooled sub-queries, spooled views and derived tables, complex joins, and dynamic fragmentation of a join plan based on cost and confidence factors.

Continuing with the embodiment of 212 and at 213, the dynamic query plan manager identifies the non-correlated scalar sub-queries as those components of the query that produce zero or a single row with a single scalar value.

Continuing with the embodiment of 212 and at 214, the dynamic query plan manager identifies the tables with single-row access via a unique primary index or a unique secondary index as those components having an access path for a table accessed via unique index to assure a single row or no row.

Continuing with the embodiment of 212 and at 215, the dynamic query plan manager identifies the single-row query blocks as those components having a derived table of query blocks that produce a single or zero row result.

Continuing with the embodiment of 212 and at 216, the dynamic query plan manager identifies the spooled sub-queries as those components for a sub-query that are not folded into an outer query.

Continuing with the embodiment of 212 and at 217, the dynamic query plan manager identifies the spooled derived tables or views as those components for a derived table or view that are not folded into an outer query.

Continuing with the embodiment of 212 and at 218, the dynamic query plan manager identifies the complex joins as those components associated with outer joins or nested joins.

Continuing with the embodiment of 212 and at 219, the dynamic query plan manager identifies the dynamic fragmentation within the query block as those components having multiple joins that alter a confidence in an estimated cardinality.

Figure 3:
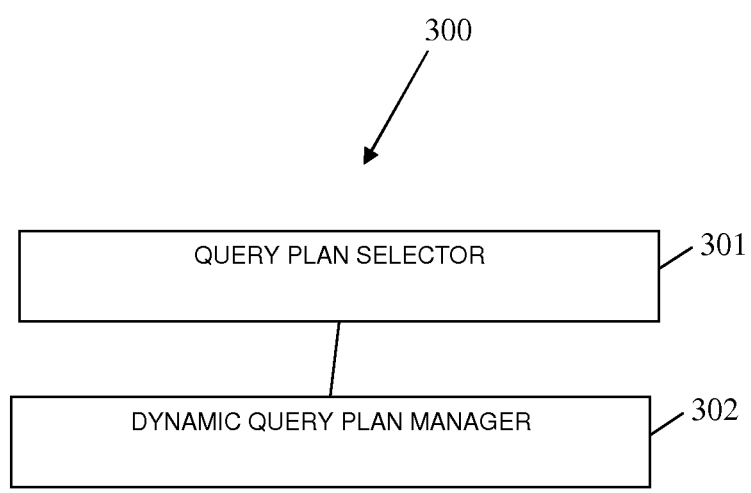
FIG. 3 is a diagram of a query plan selection system, according to an example embodiment.

FIG. 3 is a diagram of a query plan selection system 300, according to an example embodiment. The components of the query plan selection system 300 are implemented as executable instructions that are programmed and reside within memory and/or non-transitory computer-readable storage medium that execute on processing nodes of a network. The network is wired, wireless, or a combination of wired and wireless.

The query plan selection system 300 implements, inter alia, the methods 100 and 200 of the FIGS. 1 and 2.

The query plan selection system 300 includes a query plan selector 301 and a dynamic query plan manager 302.

The query plan selection system 300 includes one or more processors having memory configured with executable instructions for the query plan selector 301. The query plan selector 301 processes on one or more processors of the network. Example processing associated with the query plan selector 301 was presented above with reference to the FIG. 1.

The query plan selector 301 is configured to generate a static plan for a query and make a determination as to whether to use the static plan with the query or as to whether to generate and to use a dynamic plan for the query.

According to an embodiment, the query plan selector 301 utilizes costs, conditions, and threshold values to make the determination.

The memory is also configured with executable instructions for the dynamic query plan manager 302. The dynamic query plan manager 302 executes on the one or more processors of the network. Example processing associated with the query plan manager 302 was presented in detail above with reference to the FIG. 2.

The dynamic query plan manager 302 is configured to process components of the request and to sequentially generate request fragments having plan fragments, which are executed. Each plan fragment provides feedback to a next fragment.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented and programmed within a non-transitory computer-readable storage medium and processed by a processor, the processor configured to execute the method, comprising:

determining, at the processor, whether to execute a request via a static plan generation or a dynamic plan generation, wherein determining comprises:

producing, at the processor, a static plan by using the static plan generation to evaluate costs and conditions of the static plan;

selecting, at the processor, to process one of the dynamic plan generation for the request and the static plan for the request, and wherein selecting to process the dynamic plan generation comprises processing statistical information from intermediate spools, and wherein no portion of the dynamic plan is generated prior to selection;

in response to selection of the dynamic plan generation:
sequentially fragmenting, at the processor, the request into a plurality of request fragments;
generating, at the processor, a first plan fragment corresponding to a first request fragment from the plurality of request fragments; and
executing, at the processor, the first plan fragment; and
for each other request fragment:
generating, at the processor, a corresponding plan fragment in response to execution of an immediately preceding plan fragment;
executing, at the processor, the corresponding plan fragment; and
providing, at the processor, feedback based on execution of the corresponding plan fragment to a remaining portion of the request, wherein execution of a last plan fragment completes the request.

2. The method of claim 1, wherein selecting comprises evaluating, at the processor, the costs, the conditions, and threshold values select to process the one of the static plan or the dynamic plan generation.

3. The method of claim 2, wherein selecting further comprises selecting the static plan for the request when the static plan is a low cost plan based on comparison of the costs with the threshold values or when no opportunities exist for using a dynamic plan for the request based on the conditions.

4. The method of claim 1, wherein fragmenting comprises evaluating the request for one or more of: non-correlated scalar sub-queries, tables with single-row access based on unique indexes, single-row query blocks, spooled sub-queries, spooled views and derived tables, complex joins, and dynamic fragmentation of a join plan based on cost and confidence factors.

5. The method of claim 1, wherein fragmenting comprises generating a first request fragment as a sub-portion of the request representing a first request fragment.

6. The method of claim 1, wherein executing comprises applying feedback from the executed first plan fragment to the remaining request.

7. A method implemented and programmed within a non-transitory computer-readable storage medium and processed by a processor, the processor configured to execute the method, comprising:

evaluating, at the processor, a query to produce a dynamic query plan for a query optimizer by producing a static plan and evaluating costs and conditions of that static plan and determining that the dynamic query plan is optimal for processing the query, and wherein when determining that the dynamic query plan is optimal for processing the query further comprises processing statistical information from intermediate spools as feedback details, and wherein no portion of the dynamic plan is produced prior to determining that the dynamic query plan is optimal for processing the query;

iterating, at the processor, the query to produce a plurality of request fragments, and generating a plan fragment for each request fragment, wherein each plan fragment is generated in response to execution of a prior plan fragment; and sequentially passing, at the processor, the feedback details from executing each plan fragment to the remaining query.

8. The method of claim 7, wherein evaluating further comprises processing components of the query based on predefined conditions detected.

9. The method of claim 8, wherein iterating parsing further comprises detecting within the components one or more of: non-correlated scalar sub-queries, tables with single-row access based on unique indexes, single-row query blocks, spooled sub-queries, spooled views and derived tables, complex joins, and dynamic fragmentation of a join plan based on cost and confidence factors.

10. The method of claim 9, wherein detecting comprises identifying the non-correlated scalar sub-queries as those components of the query that produce a zero or a singlerow result with a single scalar value.

11. The method of claim 9, wherein detecting further comprises identifying the tables with single-row access via a unique primary index or a unique secondary index as those components having an access path for a table accessed via unique index to assure a single row or no row.

12. The method of claim 9, wherein detecting further comprises identifying the single-row query blocks as those components having a derived table of query blocks that produce a single-row or zero-row result.

13. The method of claim 9, wherein detecting further comprises identifying the spooled sub-queries as those components for a sub-query that are not folded into an outer query.

14. The method of claim 9, wherein detecting further includes comprises the spooled derived tables or views as those components for a derived table or view that are not folded into an outer query.

15. The method of claim 9, wherein detecting further comprises identifying the complex joins as those components associated with outer joins or nested joins.

16. The method of claim 9, wherein detecting further comprises identifying the dynamic fragmentation within the query block as those components having multiple joins that alter a confidence in an estimated cardinality.

17. A system, comprising:
memory configured with a query plan selector that processes on a processor of a network; and
the memory configured with a dynamic query plan manager that processes on the processor of the network;
wherein the query plan selector is configured to initially generate a static plan for a request and make a determination as to whether to use the static plan with the request or to generate and to use a dynamic plan for the request based on evaluation of costs and conditions for that static plan, wherein no portion of the dynamic plan is generated prior to selection of the dynamic plan, and wherein the dynamic query plan manager is configured to process components of the request and sequentially generate request fragments and their corresponding plan fragments, wherein execution of each plan fragment provides feedback to the remaining request and processing statistical information from intermediate spools as the feedback fragment, and wherein each plan fragment is generated in response to execution of a prior plan fragment.

18. The system of claim 17, wherein the query plan selector utilizes the costs, the conditions, and threshold values to make the determination.

\* \* \* \* \*